Jan. 12, 1926.
L. E. HARTER
1,569,488
FURNACE CARBURETOR
Filed June 17, 1925
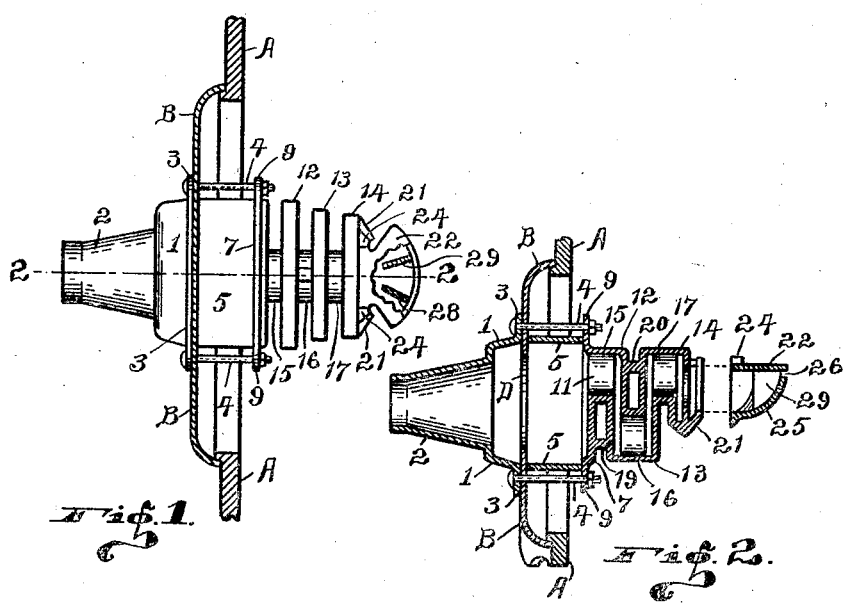
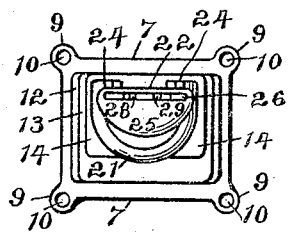
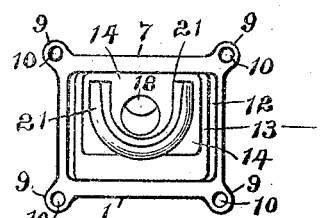
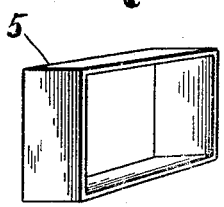
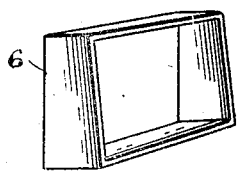
Inventor:
Lloyd E. Harter;
By Robert W. Randle,
Attorney.

Patented Jan. 12, 1926.

1,569,488

UNITED STATES PATENT OFFICE.

LLOYD E. HARTER, OF RICHMOND, INDIANA.

FURNACE CARBURETOR.

Application filed June 17, 1925. Serial No. 37,878.

*To all whom it may concern:*

Be it known that I, LLOYD E. HARTER, a citizen of the United States, residing in the city of Richmond, in the county of Wayne, State of Indiana, have invented certain new and useful Improvements in Furnace Carburetors, of which the following is a full, clear, and comprehensive specification, the same being such as will enable others to make, install, and use the same with exactitude.

The object of this invention, broadly speaking, is to provide a carburetor, or aerator, to be employed in connection with various kinds of furnaces, to provide means for producing proper combustion of the fuel, whereby all of the usable gases will be utilized in the production of heat units, thereby eliminating offensive smoke and soot, and utilizing every available unit of heat contained in the fuel fed into the furnace employed with my invention. It has been scientifically determined that in the operation of furnaces less than one-half of the inherent heat units of coal, and other fuels, are utilized in the production of usable heat. This is because furnaces are built to take the oxygen or air through the ash-pit. Then we shovel the coal on top of the incandescent bed of fuel, whereby practically all of the fresh air or oxygen is used by the incandescent fuel, which does not need it, before it can reach the fresh coal, which does need it. Therefore the result is that the rich fuel gas rising from the fresh coal is drawn up the chimney and lost, or worse than lost, as it contaminates the outside air with smoke and fumes.

Now, therefore, the particular object of this invention is to overcome, or at least minimize, all of the above mentioned objections by delivering the outside air for combustion in a horizontal fan-like film over and near to the fuel, and in a preheated condition, whereby the gases rising from the fuel are provided with the proper amount of oxygen for combustion, and that at the proper temperature, whereby the gases are caused to be consumed and converted into usable fuel or heat units.

More specifically stated, one of the particular objects is to provide a furnace carburetor having an outside air receiver, a body portion forming the air heater, and a detachable nozzle connected with the heater to distribute the hot air, and an extension collar for locating the heater properly with relation to the fuel in the furnace.

And, finally, my object is to provide a furnace carburetor which is simple in construction, automatic in its operation, requiring practically no attention for its maintenance, easily installed, adapted to preheat the air for combustion to the proper combustion temperature, and which sprays the heated air over the bed of fuel automatically by the draft of the chimney, whereby it is thoroughly diffused with the rising gases.

Other particular objects and advantages of the invention will suggest themselves in the course of the following description, and that which is new will be correlated in the appended claims.

The preferred means for carrying out the principles of my invention in a practical, efficient, and scientific manner, is shown in the accompanying drawings, in which—Figure 1 is a top plan view of the entire device in connection with a furnace door, showing the top of the nozzle member as broken away to show the deflecting wings or piers therein. Figure 2 is a longitudinal central vertical section of the entire device, as taken on the line 2—2 of Figure 1.

Figure 3 is an end elevation, taken as looking directly at the end of the nozzle. Figure 4 is an end elevation, taken in the same direction as Fig. 3, but with the nozzle member removed. Figure 5 is an end elevation of the nozzle member, taken as looking at the contact face thereof, that is directionally opposite to that of Fig. 3. Figure 6 is a perspective view of an extension collar, the same having sides and ends of equal diameter. And Figure 7 is a perspective view of an angular extension collar.

Similar indices denote like parts throughout the several views.

In order that the construction, the operation, and the several advantages of my invention may be more fully understood and appreciated, I will now take up a detailed description thereof, in which I will set forth the same as comprehensively as I may.

In the drawings letter A denotes the wall of a furnace, having the usual opening therein which is adapted to be closed by the door B. In this instance I have shown the invention as attached to the door B, however in practice it may, with equal aptitude, be connected to some other portion of the furnace, as the wall A. In order to install my invention, in the manner shown, a circular or other shaped opening is formed through the door B to be concentric with my device, said opening being indicated at D in Fig. 2. The device proper consists of four distinct elements: The air receiver; the extension collar; the radiator or main body of the device; and the detachable nozzle member.

The air receiver comprises a hollow body 1, having an open side to contact with the outer surface of the door B, and surrounds the opening at D. Extending outward from the outer face of the body 1 is the hollow cone-shaped intake nose 2, having an open outer end to receive outside air. The body 1 is substantially square or rectangular in shape, while the nose 2 is formed tapering, and is round in cross section. Extending radially from the contact edges of the body 1 is a flange 3, through the corners of which apertures are formed to receive the respective bolts 4.

The extension collar is in the nature of a square or rectangular frame, such as shown in Figs. 1, 2 and 6, with all of its sides of equal depth with relation to each other; while the collar 6, shown in Fig. 7, has two of its opposite sides of unequal depth, while the other two sides are of trapezium shape.

The radiator, or main body of the device, comprises a base-plate 7, having an ear 9 at each corner, with an aperture 10 through each ear, to receive the respective bolts 4. It is to be understood that by means of bolts of less length than the bolts 4, the collars 5 and 6 may be dispensed with, and the base 7 may be secured directly against the inner face of the door B.

Through the center of the upper portion of the plate 7 an aperture 11 is formed. Numerals 12, 13 and 14 denote the radiating or induction members, which are rectangular in shape and of slightly decreasing size, respectively, with relation to each other and to the plate 7. Each of the members 12, 13 and 14 are formed hollow to provide air chambers therein. Also said members 12, 13 and 14 are spaced apart, parallel with each other, and they are spaced from the plate 7, and are parallel therewith.

The plate 7 and the member 12 are connected by the tubular conduit 15. Likewise the members 12 and 13, and the members 13 and 14, are connected by the respective tubular conduits 16 and 17. The conduit 15 connects the aperture 11 with the interior of the upper portion of the member 12. The conduit 16 connects the interior of the lower portion of the member 12 with the interior lower portion of the member 13. And the conduit 17 connects the interior of the upper portion of the member 13 with the interior of the upper portion of the member 14. The exit from the member 14 is through the aperture 18, which is formed through the center of the forward side thereof, as shown. Thus it will be seen that the passage-way through the radiator is formed staggered, for the purpose hereinafter explained.

In order to prevent distortion or breakage, I connect the base 7 and the member 12 with a pier 19; likewise the members 12 and 13 are connected by a pier 20. The said piers being at points remote from the respective conduits 15 and 16, as shown in Fig. 2.

As is indicated in the drawings, the base 7, and the radiator members 12, 13 and 14, the conduits 15, 16 and 17, and the piers 19 and 20, are all formed integral with each other.

Formed integral with the forward face of the member 14 is the U-shaped bifurcated flange 21, which is located centrally of the aperture 18 and partly surrounding it.

The nozzle member comprises a flat horizontal top 22, with a rear face 23 which is at right-angles to the top. The rear face corresponds in size and contour with that portion of the forward face of the member 14 which is enclosed by the flange 21.

The periphery of the lower portion, and also of the sides, of that part which carries the face 23, is in the nature of a U-shaped tongue 24, which is angular or wedge-shape in cross section, Fig. 1, and the two ends of said tongue extend to a higher elevation than does the top 22. Said tongue is adapted to fit in the bifurcated channel formed by the flange 21, whereby the nozzle may be supported and wedged by gravity, into operative position, as in Fig. 1. The periphery of the forward edge of the top is segmental, whereby the top is formed flaring or fan-shaped.

Numeral 25 denotes the bottom or underside of the nozzle, it being semi-spherical in shape, extending from near the lower or central part of the tongue 24 to near the top 22, whereby a slot 26 is formed therebetween. A portion of the rear edge on each side of the top 22 is formed integral with the bottom 25, by the rear faces 27, which faces terminate at the forward edges of the tongue 24.

Connecting the bottom 25 with the top 22 are the two angularly disposed dividing piers 28 and 29, which are both directed toward the aperture 18, from which they flare forward and apart, as shown in Fig. 1. Said piers tend to divide the air as it moves toward the slot 26, whereby the air is equally divided to all parts of said slot; and said piers also prevent the parts 22 and 25 from warping, thereby preventing the slot from getting smaller or larger, which might occur without said piers, especially at the central portion of the slot 26.

In practice the device is to be assembled substantially as shown in Fig. 1, from which it will be seen that the radiator and the nozzle are located above and near the fire in the fuel chamber of the furnace, whereby said parts will become quite hot. Then if ash-pit, and all air inlets be tightly closed it is apparent that the usual draft, or suction from the chimney, will draw the air in through the nose 2, and that it will be discharged into the furnace through the slot 26.

The intake of air through the nose 2 is remote from the furnace, thereby assuring the proper kind of fresh air for the combustion. As the air travels through the radiator it of course will be heated thereby, as the circuitous route through which it must travel will result in the air becoming highly heated, assuming of course that there is a fire maintained in the fuel chamber. Also the nozzle being more directly in communication with the fire it will cause it to be heated even more than by the radiator, whereby the hot air passing through the nozzle will be superheated, passing through the slot 26 in a thin stream of great heat intensity, which will be driven directly into the gases arising from the fuel, and will cause them to burn before they can reach the exit from the combustion chamber, thereby resulting in obtaining every unit of heat contained in the fuel and converting it into usable heat to be radiated from the furnace wall.

In some instances it is desirable that the nozzle be directed slightly upward beyond normal horizontal position, in which event the collar 6 may be employed in place of the collar 5. Or if it be desired to place the nozzle still further into the fuel chamber then two or more collars may be employed, and as previously intimated herein no collar may be used at all. Or a collar beveled at right-angles to that of the collar 6 may be used to cause the nozzle to be turned to the right or the left, in fact various combinations may be made to meet various conditions. It should be understood that the shape of the detachable nozzle is such that the air coming through the aperture 18 will be deflected upward to the horizontal top 22, from which it will be given a straight outward shoot through the slot 26.

It is to be understood that the nozzle member may be made of a special heat resisting material, in order to prolong the life thereof. Also it is apparent that the nozzle may be easily changed for a new one when it becomes burned out or disfigured by reason of intense heat.

I desire that it be understood that various changes may be made in the several details herein set forth without departing from the spirit of the invention, and without sacrificing any of the advantages thereof which are new and useful.

Having now fully shown and described my invention, what I claim, and desire to secure by Letters Patent of the United States, is—

1. A furnace carburetor comprising in combination with the door, having an aperture formed therethrough, an air receiver located on the outer face of the door and around said aperture, an extension collar located on the inner face of the door and around said aperture, a radiator forming the main body extending inward from said collar, bolts connecting said air receiver, the collar, and the main body in connection with the door, and a detachable nozzle member retained by gravity in connection with the inner end of the said body, said nozzle being provided with a horizontal fan-shaped slot adapted to spray outside air as it comes from the body where it is heated, and deliver it over the interior of the combustion chamber of the furnace.

2. A furnace carburetor comprising a radiator having a staggered passage-way therethrough whereby the air passing therethrough must pass up and down therein, said passage-way being provided by a plurality of radiating members spaced apart and interiorly connected by conduits; a nozzle member retained by gravity into connection with the inner end of the radiator and interiorly connected with said passage-way, the top of the nozzle being flat and its under side formed semi-spherical, piers connecting the top and the under side of the nozzle and adapted to divide the air as it passes through the nozzle, and bolts for securing the radiator to the inner face of the door of a furnace and around an aperture formed through said door.

3. A furnace carburetor comprising in combination with a door of a furnace, with an aperture formed through said door, an air receiver secured on the outer face of the door and around said aperture, an extension collar carried by the inner face of the door and located around said aperture, a radiator comprising a base plate contacting with said collar and secured to the inner end of said collar, a plurality of rectangular and hollow radiator members spaced apart and from said base plate with which they are parallel and integral, tubular conduits connecting the base plate and the interior of said radiator members, said conduits being staggered with relation to each other, a U-shaped bifurcated flange formed integral with the inner face of the innermost radiator member and concentric with an aperture in the inner face thereof, a fan-shaped nozzle having a flat top and a segmental bottom with a slot opening from the interior thereof through its periphery, said slot being on a line with the under side of said top, piers connecting the top and the bottom of the nozzle and flaring radially toward said slot, and a tongue formed integral with the rear face of the nozzle to fit in said U-shaped flange.

LLOYD E. HARTER.